United States Patent [19]
Cronin et al.

[11] Patent Number: 5,343,546
[45] Date of Patent: Aug. 30, 1994

[54] MICROBENCH

[75] Inventors: David V. Cronin, Peabody; Louis J. Brozyna, Somerville, both of Mass.

[73] Assignee: Polaroid Corporation, Cambridge, Mass.

[21] Appl. No.: 37,273

[22] Filed: Mar. 26, 1993

[51] Int. Cl.⁵ .............................................. G02B 6/30
[52] U.S. Cl. ..................................................... 385/52
[58] Field of Search ...................... 385/49, 52; 33/1 D; 248/70

[56]     References Cited
U.S. PATENT DOCUMENTS

4,432,601  2/1984  Mannschke ........................... 385/52
5,268,978  12/1993  Po et al. ................................ 385/121

Primary Examiner—Rodney B. Bovernick
Assistant Examiner—Robert E. Wise
Attorney, Agent, or Firm—Francis J. Caufield

[57]         ABSTRACT

In a laser light pump, a multiplicity of micromanipulators adjust the positions of a cylindrical lens and line of optical fiber ends relative to each other and relative to a light source composed of a line of laser diode facets. Each micromanipulator achieves extremely fine resolution by imposing a vernier or differential screw arrangement into a flexure ratio divider, and thereby multiplying its resolving capability. The vernier screw arrangement spreads two members of different stiffnesses, and the stiffer one of the members moves the lens or the line of fiber ends.

10 Claims, 8 Drawing Sheets

MICROBENCH

BACKGROUND OF THE INVENTION

This invention relates to lasers and, particularly, to means for precisely manipulating the positions of a cylindrical microlens and a row of optical fiber waveguide input ends relative to an array of laser diodes so that the lens accurately directs light emerging from the diodes upon the fiber waveguide input ends so that it can be concentrated at the output ends of the waveguide for use in pumping a laser cavity. The invention is also directed to a simple manipulator having fine resolution reaching into the sub-micron range.

Various means are available for positioning components relative to others. Typically, such devices are too large for manipulating members of the size of laser diode arrays, cylindrical microlenses, and rows of fiber optic waveguides in the one to ten micron range. Such devices are also complex and expensive. Moreover, existing devices are frequently incapable of easily attaining resolutions in the micron or sub-micron range.

Consequently, it is a primary object of this invention is to avoid these difficulties.

Another object of the invention is to improve lasers.

Yet another object of the invention is to provide an inexpensive means for manipulating the components of systems using laser diodes and fiber optical waveguides for pumping laser cavities.

Other objects of the invention will be apparent from reading the detailed description to follow.

SUMMARY OF THE INVENTION

This invention relates to the construction and operation of precision control mechanisms for use, inter alia, in accurately aligning various components comprising an arrangement for optically pumping an optical fiber laser cavity so that available source power is used in the most optimal manner.

The position control mechanisms themselves comprise a mechanical structure having at least two members of different stiffnesses connected so that at least portions of the members can be moved in a first direction with respect to one another while other portions cannot, remaining fixed. A structural framework is provided in the form of a rigid base with the unmovable portions of the members being fixedly mounted to the structural framework such that the movable portions of the members can be positioned relative thereto.

Means are provided for adjusting the spacing between the movable portions of the members to provide for their controlled movement with respect to the structural framework. The movable portions of members move in one direction at different rates with respect to the structural framework in accordance with their stiffnesses and the spacing imposed between them; the stiffer of the two members moving the least for a given spacing. The adjusting means include a coarse adjustment and a fine adjustment to provide for vernier positioning of the movable portions of the members with respect to the structural framework, with the finest position control being of the movable portion of the stiffer of the members.

In preferred form the adjusting means comprises a nested screw arrangement for providing for fine vernier adjustment of the spacing between the flexible portions of the members.

The invention is based on the recognition that one can achieve an extremely fine resolution by imposing the already fine motion of a differential screw into the structure of flexure ratio divider.

According to a feature of the invention, the vernier screw arrangement includes a first screw element fixed on one of the pair of members and a second screw element threaded within the first and having a sleeve that engages the first screw element and a thread that engages a bolt. The latter is rotationally movable, but axially fixed, relative to the other members. The second screw element has a pin projecting therefrom for turning the second screw element, and the bolt has a disc connected thereto for turning the bolt. The thread of the first and second elements have pitches with different leads and in opposite directions.

According to another feature of the invention, each member of the pair is cantilevered relative to a third member having a greater stiffness than both of the more flexible members.

According to another feature of the invention, the structural framework, the flexible members, and the vernier screw arrangement form a motion control, and the mechanism further includes a second motion control of identical structure, but spaced from the first. The latter includes mounting means secured on one of the first members, a second pair of members having different stiffnesses mounted on the second mounting means, and a second vernier screw arrangement connecting the second pair of members to each other for moving the second pair of members relative to each other and relative to the mounting means. In particular the first pair of members extend in one direction and the second pair of members extend in a direction orthogonal thereto so that rotation of the first vernier screw arrangement moves one of the first members in one path and rotation of the second differential screw arrangement moves one of the first members along a path orthogonal to the first path.

According to another feature of the invention, one of the first pair of members forms a cradle in which the second mounting means sits.

According to another feature of the invention the two motion controls form first manipulator means for controlling the position of one end of a device such as a cylindrical lens, and corresponding second manipulator means control the position of another end of the device relative to the one end.

According to another aspect of the invention, a laser pump includes a light source having a number of aligned laser diodes, light receiving means for receiving light from the laser diodes and directing them to a laser, and alignment means coupled to the light receiving means for aligning the light receiving means with the light source. The alignment means includes a motion control coupled to the light receiving means, and the motion control includes a pair of members having different stiffnesses, mounting means for mounting the members relative to each other, and a rotatable vernier screw arrangement having a net differential pitch and connecting the members to each other for movement of the members relative to each other and movement relative to the mounting means.

In the laser pump, the alignment means includes a second motion control like the first, but whose mounting means are secured on one of the first members. The first pair of members extend in one direction and the second pair of members are cantilevered in a direction orthogonal thereto so that rotation of the first vernier screw arrangement moves one of the first members in one path and rotation of the second vernier screw arrangement moves one of the first members along a path orthogonal to the first path. Again, one of the first pair of members forms a cradle in which the second mounting means sits.

According to another feature of the invention the two motion controls with the two pairs of members and the two mounting means and the two screw arrangements form first manipulator means for controlling the position of one end of the light receiving means and a corresponding second manipulator means controls the position of another end of the light receiving means relative to the one end.

According to another feature of the invention, the light receiving means includes a cylindrical lens and a number of aligned ends of optical fibers whose other exit ends are stacked. A grooved block supports the entry ends. Separate manipulating means position each end of the lens and the block so as to locate the lens and fibers relative to the diode lasers for optimal light output.

The invention offers the advantage of permitting precise submicron translational displacement of small members with simple, substantially larger, rotational movement of knobs and pins. The invention further offers precise location for directing light from laser diode arrays into aligned optical fiber waveguide ends with a cylindrical lens. This results in optimizing pump light for lasing action.

These and other features of the invention are set forth with particularity in the claims. Other objects and advantages of the invention will become evident from the following description.

BRIEF DESCRIPTION OF THE DRAWINGS

The principles of the invention may best be understood by considering the following detailed description in conjunction with the accompanying drawings, in which.

DETAILED DESCRIPTION OF PREFERRED EMBODIMENTS

Figure 1:
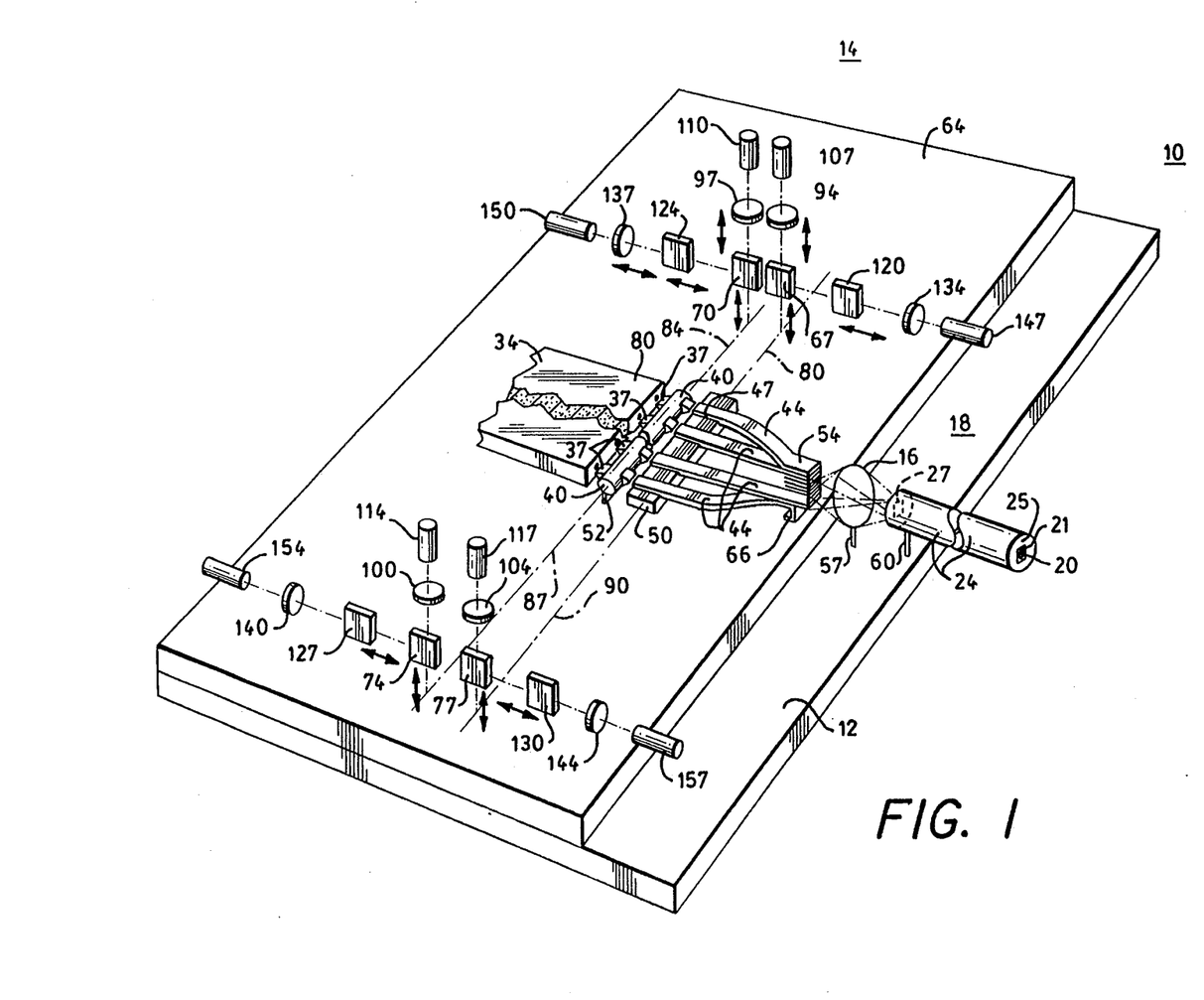
FIG. 1 is a diagrammatic, partially exploded, and perspective view of a laser system embodying the invention and using manipulators, shown as blocks and also embodying the invention, to align a diode array, a cylindrical lens, and optical fiber entry ends.
Figure 2:
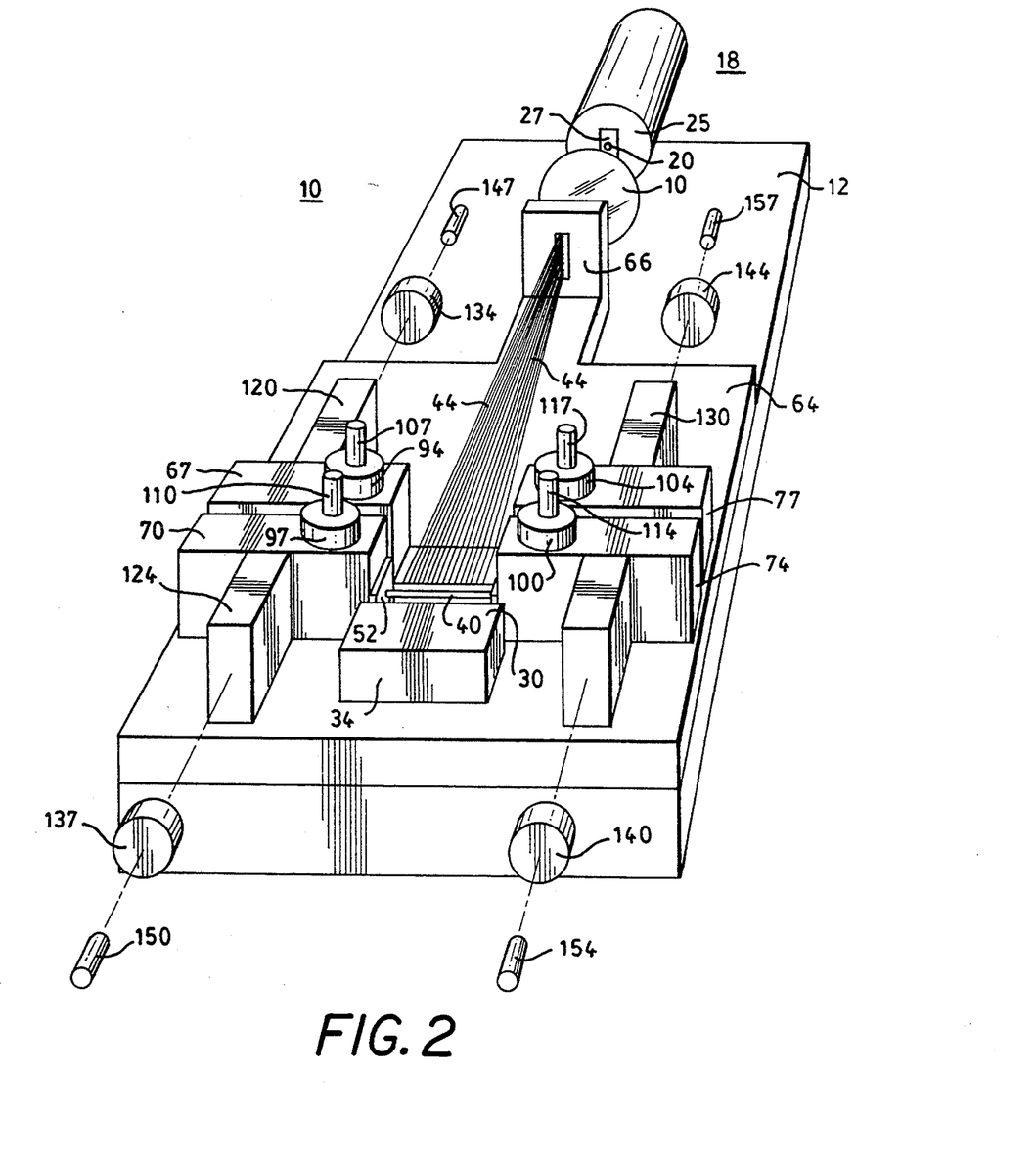
FIG. 2 is another diagrammatic, partially exploded, and perspective view of the laser in FIG. 1 embodying the invention, and using manipulators, shown as blocks and also embodying the invention, to align a diode array, a cylindrical microlens, and optical fiber entrance ends.

In the diagrammatic, partially exploded views of FIGS. 1 and 2 of the apparatus embodying the invention, a laser 10 sits on a structural framework in the form of a base 12 and includes a microbench generally designated 14, a microlens 16 mounted on the base 12, and a resonant cavity 18. The laser cavity 18 is in the form of an optical fiber that includes a single mode core 20, a multi-mode cladding 21 with a rectangular cross-section, an outer cladding 24 and a partially reflective output surface 25 that forms part of the feedback for the laser cavity. Pump light from the lens 16 enters the cavity 18 through a rectangular input end face 27 of the multimode cladding 21. Reflections in the cladding 21 pump the core 20 as pump light propagates along the length of the cladding 21 intersecting the core 20 many times as it does so thereby causing the core 20 to absorb it to promote lasing action.

For pumping purposes the laser 10 includes a laser light source 30 in the form of a semiconductor laser diode array 34 having laser diodes with rectangular, horizontally extending, light emitting, laser diode facets 37 horizontally aligned with each other to form the array. Each facet 37 radiates over a numerical aperture of 0.6 along an azimuth perpendicular to the length of the emitting facet, and over a numerical aperture much smaller in the horizontal direction orthogonal thereto. A cylindrical lens 40 images each of the laser diode facets onto respective flat, horizontally-extending, rectangular ends of optical carrier fibers 44, which sit in a series of complementarily configured, precisely shaped and spaced, grooves 47 of a block 50. The grooves 47 are formed in the block 50 with photolithographic and preferential etching techniques. A mounting bracket 52 holds the cylindrical lens 40.

The opposite or output ends of the rectangular fibers 44 merge into a rectangular stack 54 in which each and has a numerical aperture of 0.2. The lens 16 is a 3× reduction lens which images the rectangular stack 54 to a size equal to or slightly smaller than the input end face 27 of the cavity 18. Supports 57 and 60, shown only schematically, mount the lens 16 and cavity 18 on the base 12.

The elements 30 to 54 are mounted on the microbench 14. The latter includes a mounting plate 64 which braces a bracket 66 that holds the stack 54. The plate 64 also supports micro-manipulators 67, 70, 74 and 77 that move schematically illustrated holders 80, 84, 87, and 90 vertically up and down relative to the plate 64. The holders 84 and 87 position the mounting bracket 52 of the cylindrical lens 40 while the holders 80 and 90 support the alignment block 50. The micro-manipulators 67, 70, 74, and 77 include respective peripherally knurled adjustment discs 94, 97, 100, and 104 to actuate the coarse vertical motion, and knurled fine adjustment pins 107, 110, 114, and 117 to actuate fine vertical motion.

Horizontal micro-manipulators 120, 124, 127, and 130, mounted on the plate 64 horizontally move the micro-manipulator 67, 70, 74, and 77 in the forward and backward horizontal directions. Respective peripherally knurled coarse adjustment discs 134, 137, 140, and 144 coarsely move the horizontal micro-manipulators 120, 124, 127, and 130 in the horizontal direction, while peripherally knurled fine adjustment pins 147, 150, 154, and 157 finely adjust the movement of the manipulators 120, 124, 127, and 130. Horizontal movement of the micro-manipulators 120, 124, 127, and 130 move not only the vertical manipulators 67, 70, 74 and 77 but also the supports 80, 84, 87, and 90, and hence the cylindrical lens 40 and the alignment block 50. The vertical arrows illustrate the direction of movement in the vertical direction, while the horizontal arrows indicate the direction of movement in the horizontal direction.

In operation, an operator adjusts the discs 134, 137, 140, and 144 as well as the pins 147, 150, 154, and 157 so that the lens 40 moves vertically and horizontally at each end until the lens precisely images the facets 37 onto the input ends of the fiber carriers 44. This assures optimal output at the stack 54 at the end of fibers 44 and at the exit in the mirror 27 of the laser cavity 18.

Figure 3:
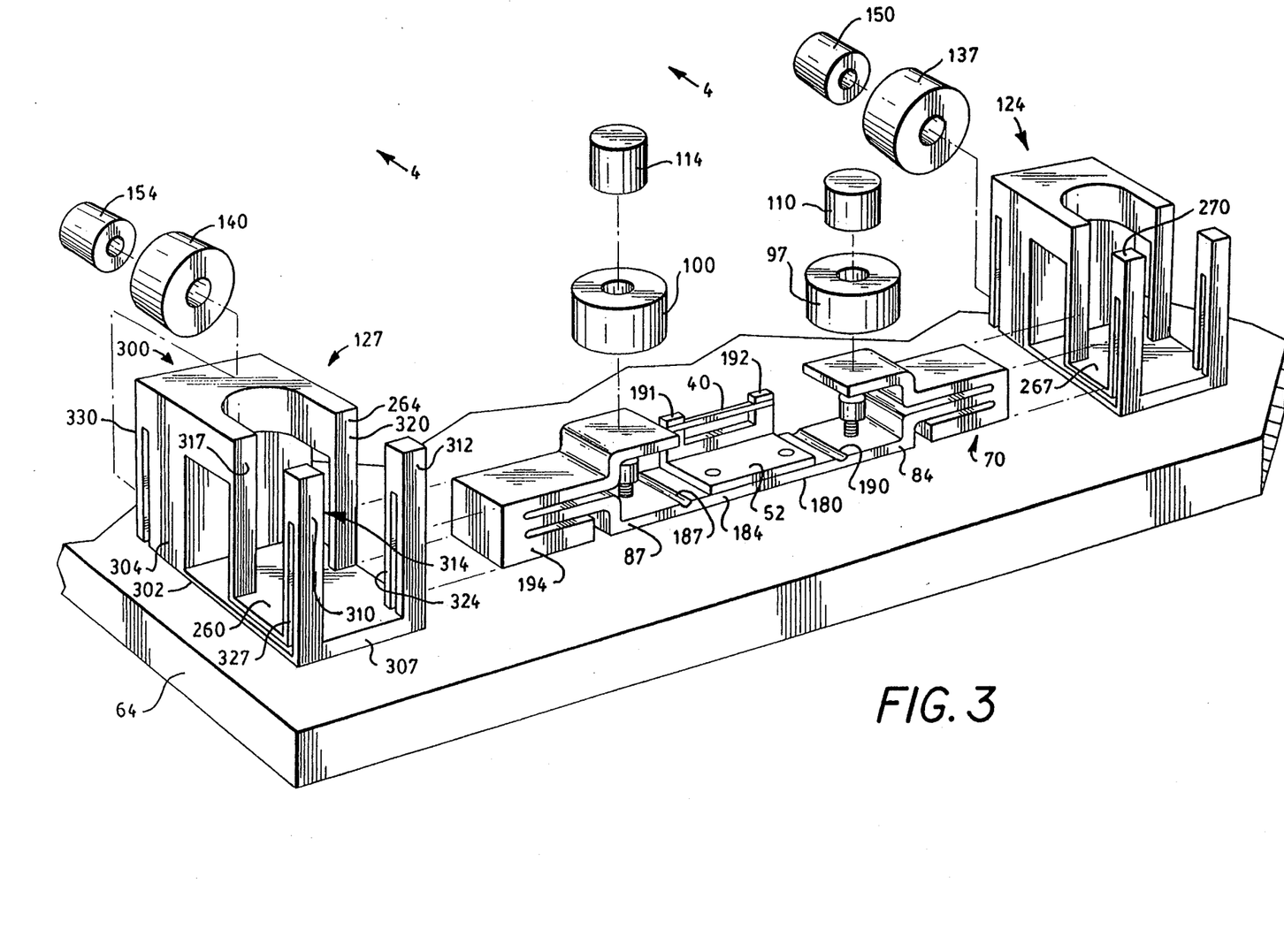
FIG. 3 is another diagrammatic, partially exploded, and perspective view of the lens in FIGS. 1 and 2 with details of the manipulators for controlling the position of the lens.

Details of the cylindrical lens 40, mounting bracket 52, holders 84 and 87, micromanipulators 70 and 74, micromanipulators 124 and 127, adjustment discs 97 and 100, adjustment discs 137 and 140, adjustment pins 110 and 114, and adjustment pins 150 and 152 appear in FIGS. 3, 4, 5, and 6. As shown in FIG. 3, the micromanipulators 70 and 74 terminate in the holders 84 and 87 which integrally form part of a flat plate 180 with a center section 184. Grooves 187 and 190 separate the holders 184 and 187 from the center section 184 and make the plate 180 sufficiently flexible at the grooves so that upward and downward movement of the holders 84 and 87 can independently move the ends of the bracket 52 up and down. This imparts independent up and down movement to the ends of the lens 40 held by the upward arms 191 and 192 of the bracket 52. That is to say, the grooves 187 and 190 make the plate 180 thin enough at the grooves so that the plate flexes at the grooves in response to upward and downward movement of the holders 84 and 87 relative to the plate 64.

Figure 4:
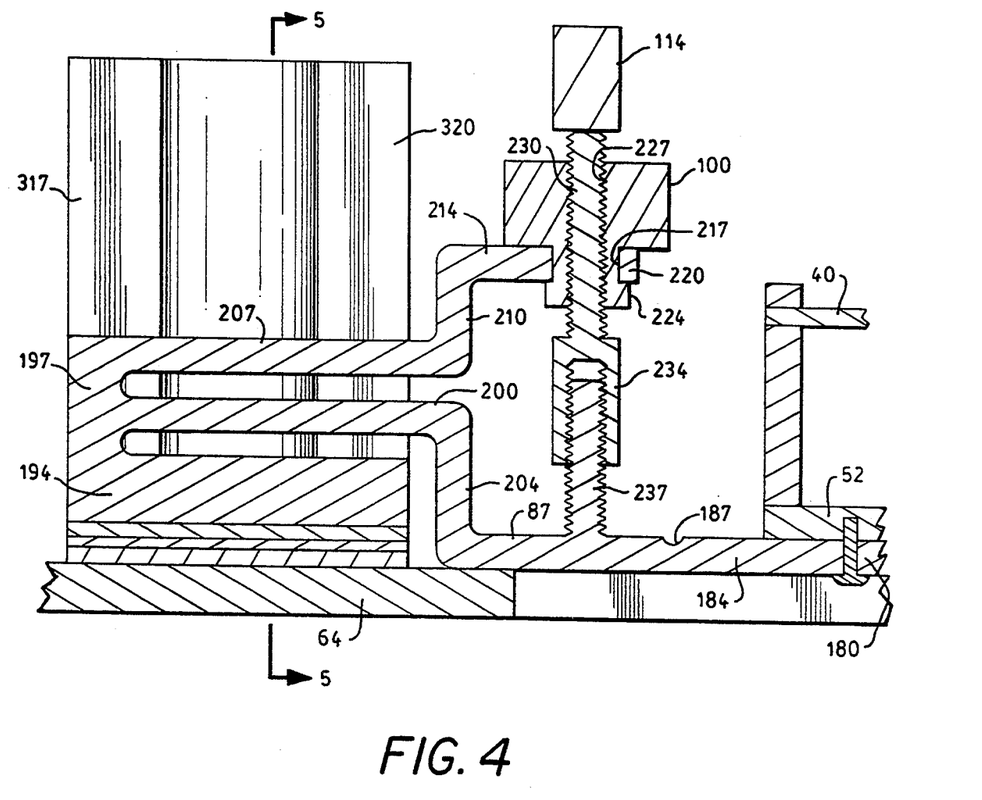
FIG. 4 is a partially diagrammatic sectional elevation along the section 4—4 of manipulators in FIG. 3.

As shown in FIGS. 3 and 4, the micromanipulator 74 includes a rectangular base 194 with an integrally upstanding end support 197 and integrally connects to the flat holder 87 through an integrally mounted vertical plate 204. Projecting integrally from the upper end of the flat vertical support 197 is a flat resilient upper lever arm 207 which bends upwardly at a vertical rise 210 and terminates in a flat holder 214. The thickness, and hence the stiffness, of the lower arm 200 is substantially greater than the thickness of the upper arm 207 for the purpose of forming a differential flexure (or stiffness) arrangement. The differential flexure arrangement combines with a vernier screw pitch arrangement to produce a fine resolution by imposing the fine motion of the screws upon the differential flexure arrangement.

For purpose of the vernier screw pitch arrangement, the coarse adjusting disc 100 forms an end shaft 217 that passes through an opening 220 and terminates in a flange 224 to form a slip fit relative to the plate 214. The disc 100 has center threads 227 which engage the outer threads of a screw 230 integrally secured to the knurled pin 114. The screw 230 terminates in an interiorly threaded sleeve 234 which engages an upstanding screw 237 fixed to the holder 87. The pitches of the screws 230 and 237 are in opposite directions and are different from each other. The pitch of the screw 230 is greater than the pitch of the screw 237. According to an embodiment of the invention, these screw sizes are reversed.

When an operator turns the disc 100, it moves the plate 214 relative to the holder 87 and hence the upper arm 207 relative to the lower arm 200. Engagement between the threads of the disc 100 and the screw 230 is sufficiently smooth to prevent the sleeve 234 from turning relative to the screw 237 while the disc 100 is turned. Alternatively, one may hold the knurled pin to keep it from rotating. The rotation of the disc 100 imposes a change in separation between the thinner upper arm 207 and the thicker lower arm 200. The arms 200 and 207 share the change in separation which is predictable and proportional to their flexural compliances. By making the arm 200 of the same material and integral with the arm 207 yet thicker than the arm 207 the arm 200 is much stiffer than the arm 207. Accordingly, most of the separation motion between the arms 200 and 207 imparted by the turned disc 100 produces a smaller proportion of the movement to the holder 87. Thus, turning of the disc 100 imparts comparatively fine movement of the holder 87 relative to the base 194. The movement of the holder 87 in the up and down direction shifts the end of the center portion 184 of the plate 100. Hence the bracket 52 moves upwardly and downwardly on the left side as shown on FIGS. 3 and 4. This raises and lowers the left end of the lens 40. The groove 187 forms a flexible joint in the integral member composed of the plate 180 and the holder 187, to allow relative motion of the left end of portion 184 in FIGS. 3 and 4.

Finer movement of the holder 187 results from turning of the knurled pin 114 relative to the screw 237. These screws have threads in opposite directions. That is, turning of the pin 114 causes the disc 100 and arm 207 to move relative to the arm 200 in one direction while the same rotary motion at the sleeve 232 causes the separation between the plate 214 and the holder 87 to move in the opposite direction. The net motion of the holder 87 is thus determined by the difference in pitch of the screws 230 and 237. Since these pitches are available in values close to each other and in opposite directions a very fine motion results. However, the range of motion is comparatively small because a small change in the position of the holder 87 results from a comparatively large shift in the screw 237 relative to the sleeve 234.

In this way, the disc 100 can provide a comparatively fine motion, which is nevertheless coarse relative to the motion furnished by rotation of the pin 114. The range of the coarse motion available from the disc 100 is limited only by the limit of upward movement in the less stiffer arm 207 within its elastic limit.

Figure 5:
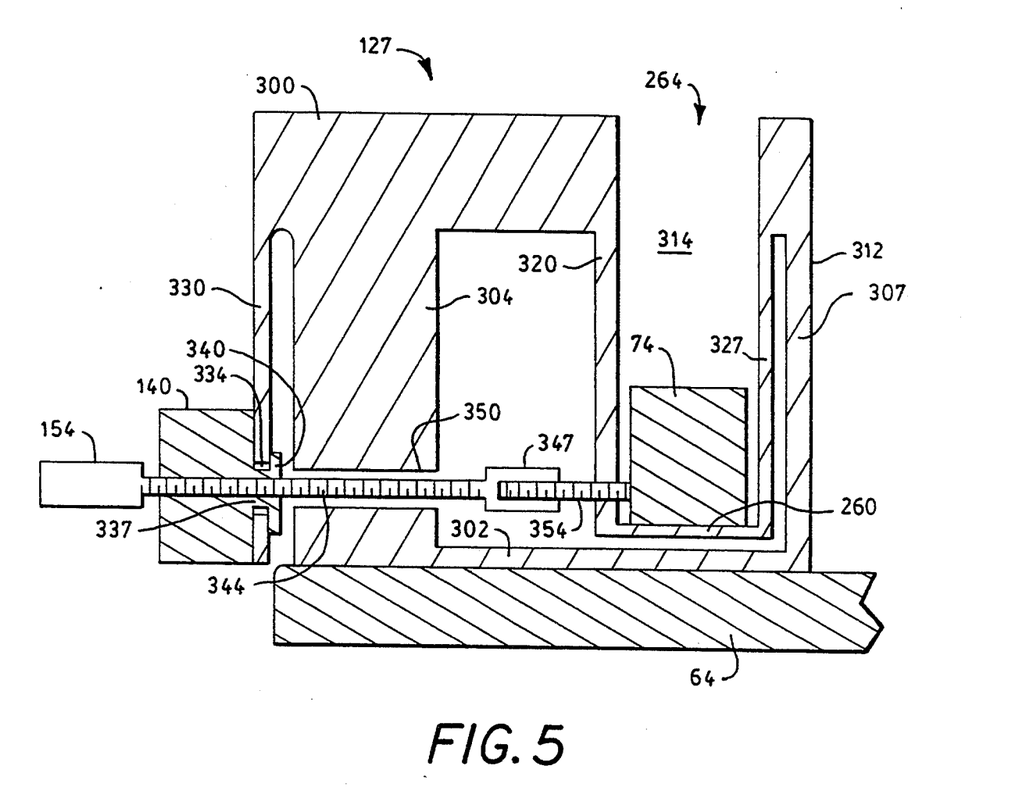
FIG. 5 is a partially diagrammatic sectional elevation along the section 5—5 of manipulators in FIG. 4.

As shown in FIGS. 3 and 5, the micromanipulator 74 has its base 194 sitting at the bottom 260 of a recess 264 in the micromanipulator 127. Similarly, the micromanipulator 70 sits at the bottom 267 of a recess 270 of the micromanipulator 124. The micromanipulator 70 is the mirror image of the micromanipulator 74 and operates in the same manner. It moves the right end of the center section 184 and the bracket 52 and hence the lens 40 through the flexible joint formed by the groove 190 by means of the holder 84. In this manner the micromanipulators 70 and 74 cooperate to adjust the lens 40 vertically.

According to the invention, the unbiased spacing of the arms 200 and 207 relative to each other is wider than the outside range of the travel caused by the disc 100 and pin 114. Hence, the arms 200 and 207 always bias the disc 100, the screw 230, and the sleeve 234 relative to the screw 237 outwardly relative to each other. Hence, no backlash exists during the adjustment and operation of the micromanipulator 74. Suitable screws (not shown) secure the base 194 to the bottom 260. According to another embodiment, the spacing of the arms 200 and 207 is narrower than the aforementioned range of travel to effect the same elimination of backlash.

Figure 6:
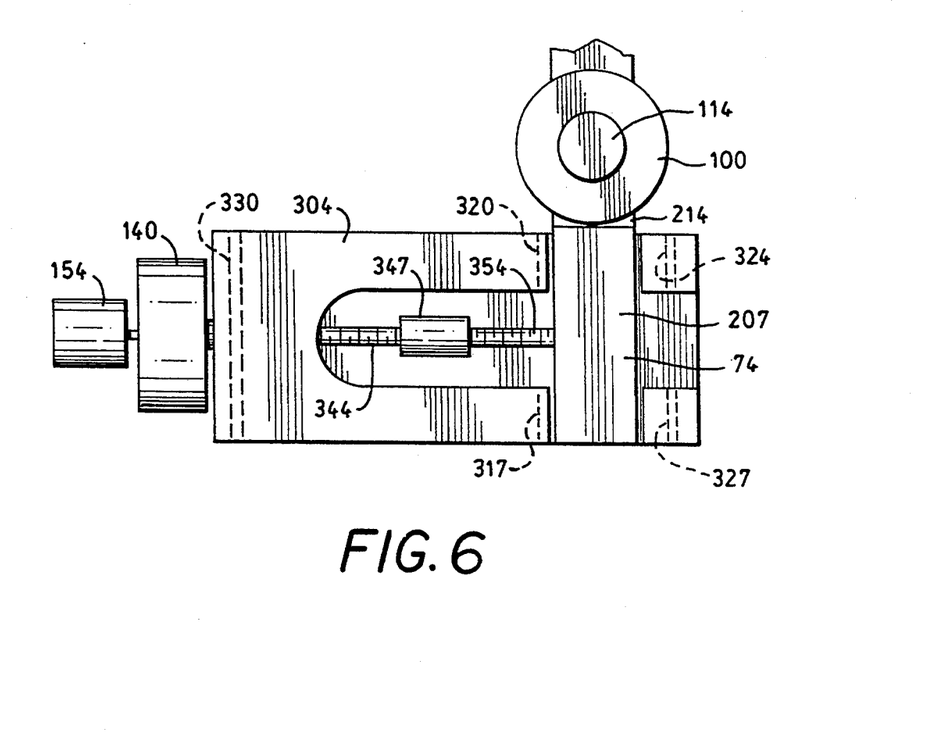
FIG. 6 is a partially diagrammatic plan view of the manipulators in FIGS. 4 and 5.

As shown in FIGS. 3, 5, and 6, the micromanipulator 127 includes a beam structure 300. The latter includes a flat base member 302 from one end of which a rigid mounting wall 304 integrally projects. Projecting upwardly from the other end of the base member 302 is a split wall 307 composed of two upstanding section 310 and 312. The walls 307 and 304 form the recess 264 in which they suspend a cradle 314 whose base 260 securely holds the micromanipulator 74. In the cradle 314, four resilient parallel arms 317, 320, 324, and 327 form a downwardly extending combination cantilever. Forming a second cantilever is a resilient depending arm 330 with an opening 334. Passing through the opening 334 is a shaft 337 that terminates in a flange 340. The knurled disc 140 with its shaft 337 and flange 340 forms a slip fit relative to the arm 330. The interior of the disc 140 is threaded and engages a screw 344 integral with the pin 154 and terminating with an integral interiorly threaded sleeve 347. The screw 344 passes through an opening 350 in the upstanding structure 304 without engagement thereto. The sleeve 347 threadingly engages a screw 354 fixedly secured to the base 194 of the micromanipulator 74. The screw 354 passes between the arms 317 and 320 in the cradle 314.

The combination of the arms 317, 320, 324, and 327 are stiffer than the arm 330. The screws 334 and 354 are threaded in opposite directions. The operation is similar to the operation of the micromanipulator 74. Turning of the disc 140 moves the screw 344 back and forth and changes the separation between the arms 317 and 320 on the one hand and the arm 330 on the other. The change at the arms 317 and 320 results from the difference in compliance between the integrally connected arms 317, 320, 324, and 327 and the arm 330. The combination of the arms 317, 320, and 324, and 327 is stiffer than the arm 330. Hence, rotation of the disc 140 moves the cradle 314 less than the arm 330. This differential flexure arrangement provides for a reduced motion of the cradle 314 and hence the micromanipulator 74 in the horizontal direction. Nevertheless, this motion is comparatively coarse relative to that introduced by the rotation of pin 154. This turns the sleeve 347 relative to the fixed screw 354 and the screw 344 relative to the disc 140. However, because the pitches of the screws 344 and 354 are in the opposite directions, the resulting movement is the differential of the movement introduced by the opposing screw forces. Hence, the horizontal translation of the micromanipulator 74 is extremely fine relative to that introduced by rotation of the disc 140.

The unstressed separation of the arms 317, 320, 324, and 327 from the arm 330 is such as to bias the disc 140 and sleeve 347 outwardly relative to the screws 354 and 344. This biasing forces prevents slack or backlash throughout the ranges of the motions of the disc 140 and pin 154 as well as the cradle 314. The limit of the range of the motion which the disc 140 can introduce on the part of the micromanipulator 74 is a function of the range of resilience of the more compliant arm 330. In another embodiment of the invention, the unstressed separation biases the disc 140 and sleeve 347 inwardly to prevent backlash.

The micromanipulator 174 is identical to the micromanipulator 127, except that it receives the micromanipulator 70 from the opposite direction. The operations of the two horizontal micromanipulators 124 and 127 are substantially identical. When the micromanipulator 127 moves the micromanipulator 74 forward or backward, the latter the moves one side of the bracket 52, and hence the one side of the lens 40 in the same direction. Similarly, movement of the micromanipulator 124 of the micromanipulator 70 in the forward and backward directions results in corresponding movement of the bracket 52 and lens 40 in the horizontal direction.

The micromanipulators 67 and 77 are substantially identical to the micromanipulators 74 and 70 respectively. They operate in substantially the same manner through the holders 80 and 90 to move the block 50 and the fibers 44 vertically to align them with the lens 40.

The horizontal micromanipulators 130 and 134 are mirror images of the micromanipulators 127 and 124. In effect, micromanipulator 130 is identical to the micromanipulator 124 while the micromanipulator 120 is identical to the micromanipulator 127. The horizontal micromanipulators 120 and 130 move the vertical manipulators 67 and 77 horizontally to adjust the block 50 in the end faces of the fibers 44 horizontally relative to the lens 40. In effect, micromanipulators 67, 70, 74, 77, 120, 124, 127, and 130 allow for universal adjustment of the lens 40 and fibers 44 relative to each other and relative to the fixed facets 37 of the laser diode array 34 in the laser diode source 30. Proper positioning assures optimizing light passing into the entrance face 25 of the laser cavity 18. This provides maximum efficiency of operation.

In FIG. 4, the screws 230 and 237 have pitches which are very close to each other but in opposite directions. This provides the fine motion achieved by the pin 114, namely small changes for a large number of turns of the pin. Corresponding screws in the other vertical micromanipulators 67, 77, and 70 have similar ratios. In FIG. 5, the screws 344 and 354 have pitches close to each other but in opposite directions. This produces a very fine motion, namely small translational advance for a large number of turns of the pin 54. Corresponding screws in other horizontal micromanipulators 120, 130, and 124 have substantially identical pitch ratios.

The micromanipulators make use of two means of obtaining fine motion, namely a vernier or differential screw arrangement and a differential flexure arrangement. The invention furnishes a micromanipulator which has a sub-micron resolution, for example 0.5 microns, movement over a wide range, for example 100 microns, of comparative simplicity, and sufficiently small size so that a number of them fit within a fiber laser package. Thus, the invention furnishes positioners substantially smaller and simpler than otherwise available, and is capable of accurate submicron resolution and excellent range.

According to an embodiment of the invention, the output of the laser end is a measure of the accuracy of adjustment. That is, means for measuring the output of the laser determine the accuracy with which the fibers 44 lie with respect to the lens 52 and the latter with respect to the facets 37.

Figure 7:
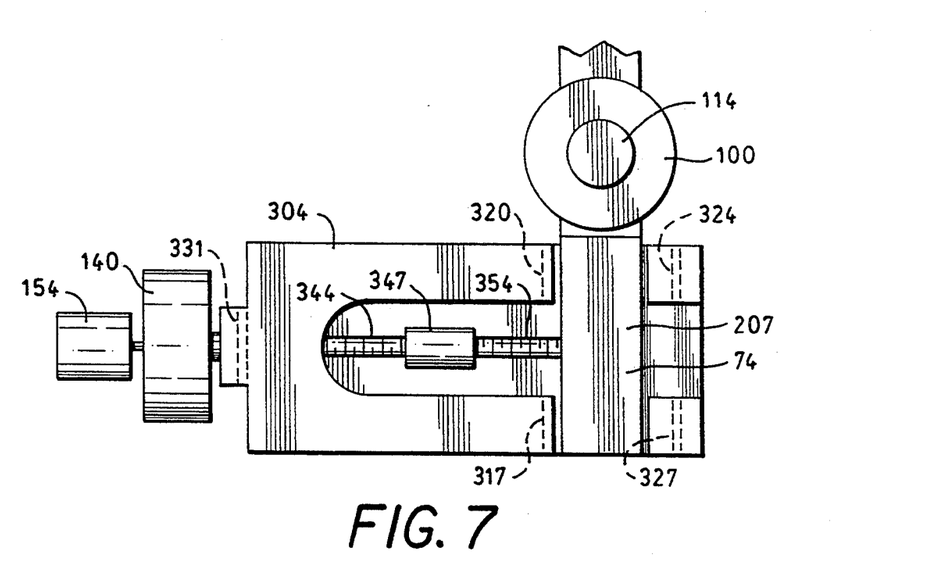
FIG. 7 is a partially diagrammatic plan view of another embodiment of the manipulators in FIGS. 4 to 6.

FIG. 7 is a diagrammatic plan view, similar to FIG. 6, of another embodiment of the invention. This differs from the embodiment in FIGS. 3 to 6 in that an arm 331 replaces the arm 330. The arm 331 is narrower along the vertical direction of FIG. 7 than the arm 330 in FIG. 6. Hence, the arm 331 is less stiff and more compliant than the arm 330. The embodiment in FIG. 7 is otherwise the same as the embodiments of FIGS. 3 to 6.

Figure 8:
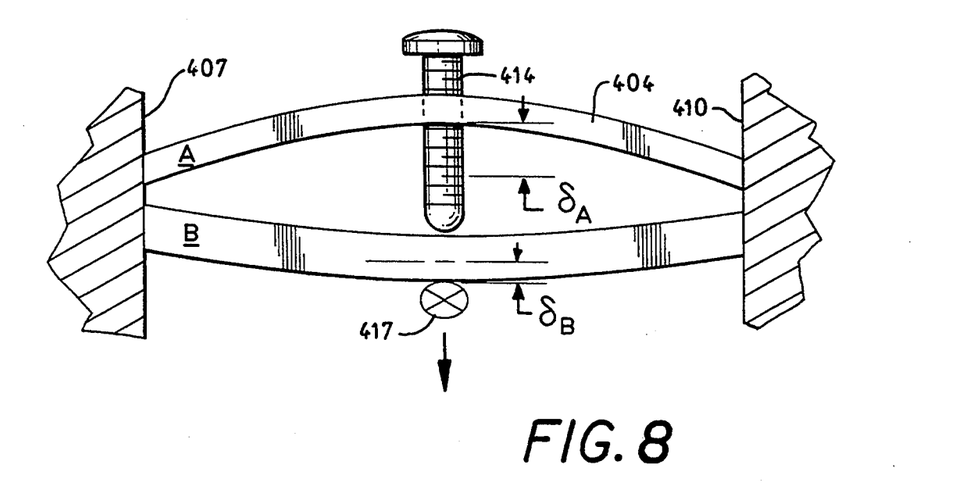
FIG. 8 is a diagrammatic sectional view of a device for explaining the operation of the manipulators in FIGS. 1 to 7.

FIG. 8 is a diagrammatic representation showing the principle of differential flexure. Here, two resilient beams 400, and 404 extend between two supports 407 and 410. A screw 414 engaging threads within the beam 404 and pressing against the beam 400 imposes a separation between the two beams. The beam 400 is thicker and less flexible than the beam 404. The screw 414 bears on the beam 400 in such a way as to move the point of interest 417 in the downward direction. The beams 400 and 404 share the total change in separation in the ratio $\delta_A/\delta_B$ which is proportional to the flexural compliances of the beams 400 and 404. Therefore, to achieve a very fine motion at point 420, we make the beam 400 much stiffer than the beam 404. This results in a limited range because beam 404 runs out of available travel within its elastic range more quickly the more limber it is relative to the beam 400.

Vernier or differential screws are capable of very fine resolution because they use two screws whose pitches are very close to equal to achieve the differential advancement. This results in limiting the range in the form of many turns per millimeter.

The invention uses the two principles, namely differential flexure and vernier or differential screw movement in combination. By using a relatively small flexure ratio the system can furnish a large range of coarse motion. Ordinary screw pitches of the commercially available type permit compound screws to keep the complexity down. The invention achieves fine resolution ultimately by imposing the flexure ratio divider upon the already fine motion of the differential screw.

Figure 9:
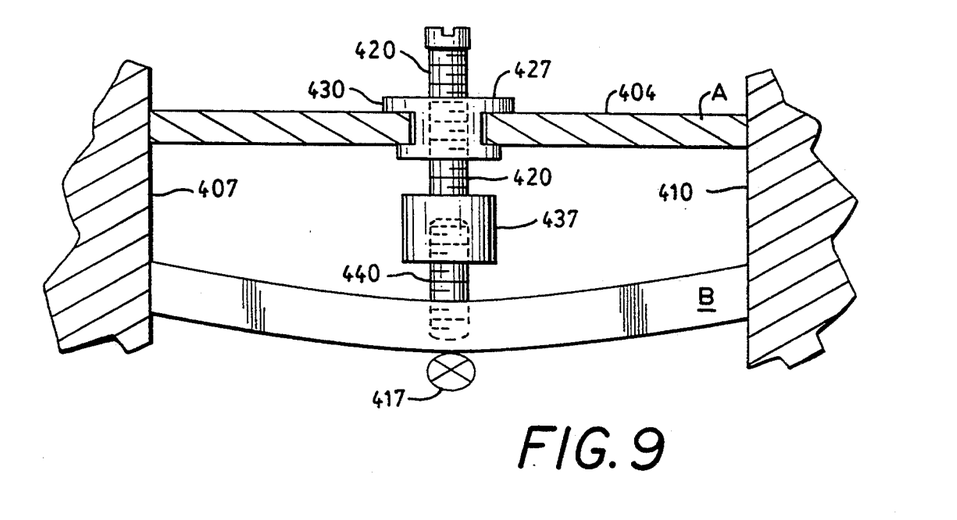
FIG. 9 is a diagrammatic sectional view of another device employing the invention, for the purpose of explaining the invention.

A simplified version of the combined system appears in the diagrammatic representation of FIG. 9. This structure is the same as that of FIG. 8, except that a screw 420 replaces the screw 414; a slip fit collar 427 with a disc 430 intervenes between the beam 404 and a sleeve 437 integral with the end of the screw 420 fits around a screw 440 fixed to the beam 400. The point of motion is still the point 417. The screws 420 and 440 have opposing pitches of slightly differing magnitudes. The differences in flexure of beams 400 and 404 is the same as that in FIG. 8. Screws 460 and 450 have different pitches and have the effect, therefore, of imposing a change in separation between the beams 400 and 404 whose magnitude is the difference in the pitches or leads of the two screws per turn of the screw 420. The disc 430, when rotated, provides relatively large range of motion by acting on the vernier screw motion to produce separation of the beams 400 and 404. The screw 420 does not turn while the collar or disc rotates.

Figure 10:
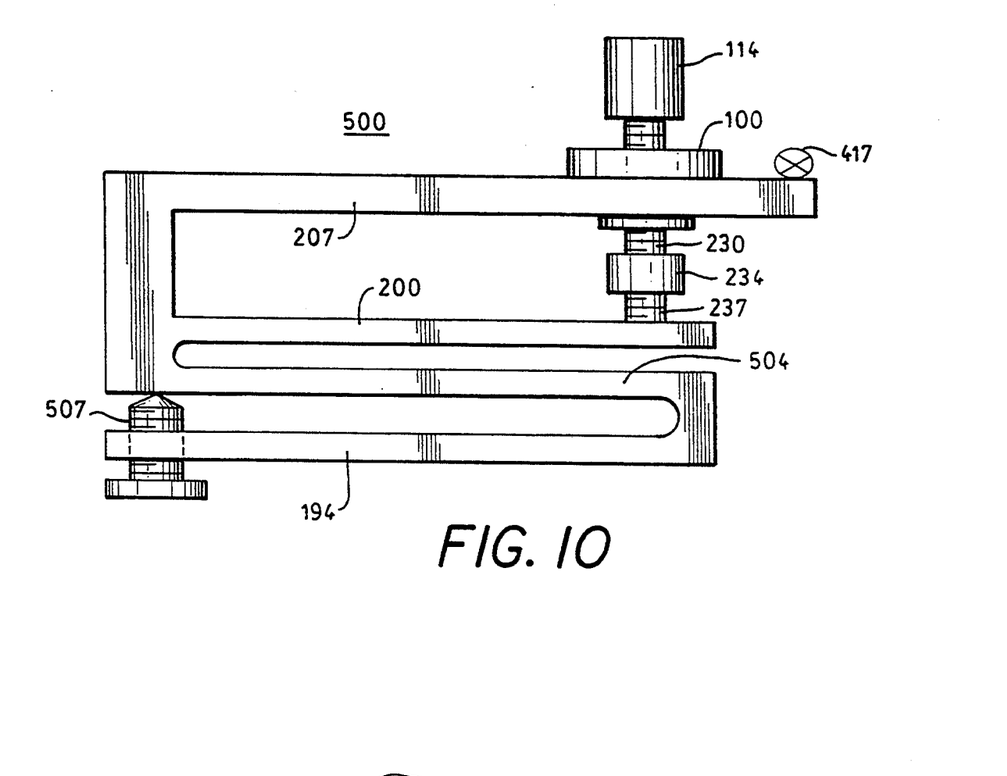
FIG. 10 is diagrammatic sectional view of another manipulator embodying the invention.

FIG. 10 illustrates yet another embodiment of the invention. Here a micromanipulator 500 is similar to the micromanipulator 74 and members having the same structure are identified by the same reference characters. However, here the base 194 is slotted to form yet another cantilever arm 504. A screw 507 raises the arm 504. This provides a coarse motion which adds to the fine and, previously coarse but now medium motion imparted by the disc 100. The pin 114 still furnishes the fine motion.

Figure 11:
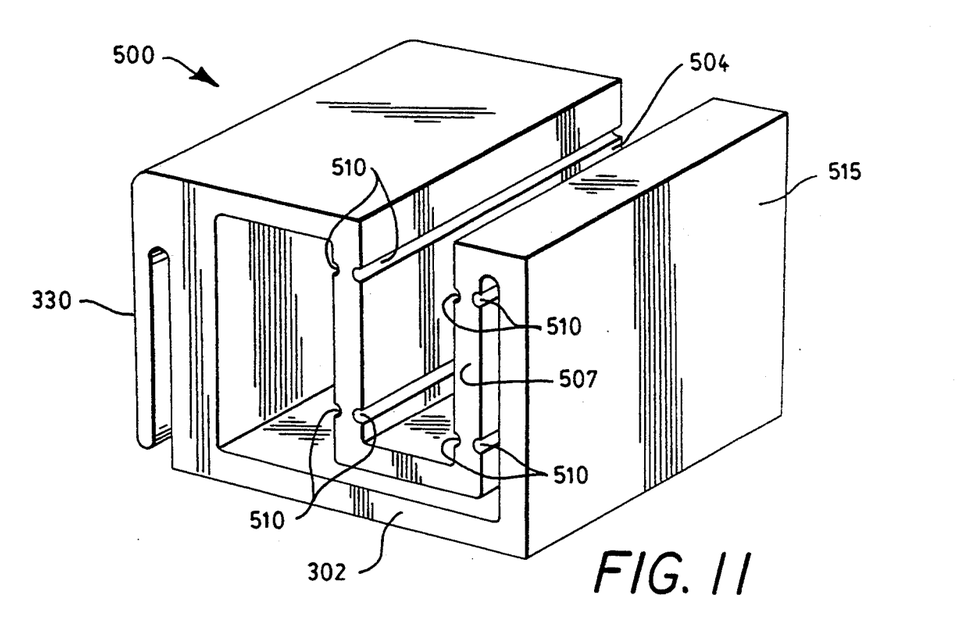
FIG. 11 is a diagrammatic perspective view of a structure usable in the manipulators of FIGS. 1 to 7 in place of the corresponding structure shown in FIGS. 4 to 7.

FIG. 11 illustrates diagrammatically, a variation in the embodiment of FIG. 5 for the integral structure of 300. Here, cradle structure 500 instead of having split upstanding walls 304 and 307, contains walls 504 and 507 with grooves 510 in the cradle 264 to lower the flexure of the cradle relative to the arm 330. A wall 514 substitutes for the split wall with sections 310 and 312.

The following are examples of the resolutions available from standard size threads. For the screws 230 and 237 or the screws 344 and 354, we can use a size 0 and a size 1 thread. The size 0 thread has a major diameter of 0.060 inches, 80 threads per inch, with a lead of 0.0125 threads per inch. The size 1 screw has a major diameter of 0.073 inches, with 72 threads per inch and a lead in inches per thread of 0.0139. The differential lead is then 0.0014 inches or 35.56 microns. The size 2 screw has a major diameter of 0.086 inches, 64 threads per inch, a lead of 0.0156 inches per thread. Using this size screw with a size 1 screw, we obtain a differential lead of 0.0017 inches or 43.18 microns.

A size 3 screw has a major diameter of 0.099 inches, 56 threads per inch, resulting in a lead of 0.0179 inches per thread. Using this number 3 screw with a number 2 screw, we obtain a differential lead of 0.0023 inches or 58.42 microns.

A size 4 screw has a major diameter of 0.112 inches, 48 threads per inch, a lead of 0.028 inches per thread, while a number 5 screw has a major diameter of 0.125 inches, 44 threads per inch, a lead of 0.0227 inches per thread. Using a number 4 screw with a number 3 screw in differential relationship, we get a differential lead of 0.0029 inches or 73.66 microns. Using a number 5 screw in differential relationship with a number 4 screw, we obtain a differential lead of 0.0019 inches or 48.26 microns.

It is clear that the best results are achieved with the use of a size 0 and 1 screw, with a size 1 and 2 screw next. After that, size 4 and 5 screws are most suitable.

According to an embodiment of the invention, the screws 230 and 344 are size 1 screws and the screws 237 and 354 are size 2 screws. A 1/20th of a turn on the coarse discs 100 or 140 produces an advance of 0.0139/20 equal to 0.0007 inches or 28 microns, not counting the effect of the flexure differential. Using the fine resolution by turning the pins 114 or 154, 1/20th of a turn produces an advance of 43.18/20 equal to 2.1 microns. If the flexure ratio between the arms 200 and 207, or between the arm 330 and the arms 317 to 327 are 4 to 1, the net resolution is 2.1 divided by 4 or 0.5 microns.

According to another embodiment of the invention, an even greater resolution is obtained by using a size 0 for the screws 230 and 344 and size 1 for the screws 237 and 354. A 20th of a turn in the fine pins 114 or 154 produces an advance of 35.56/20 or 0.18 microns. Using a 4 to 1 flex ratio between the arms 200 and 207, or between the arm 330 and the arms 317 to 327, the resulting resolution is 1.8 divided by 4 or 0.45 microns.

These embodiments offer the advantage of permitting precise sub-micron translational displacement of small members with simple, substantially larger, rotational movement of discs and pins. They permit precise positioning for maximizing light from laser diode arrays into aligned optical fiber waveguide ends with a cylindrical lens.

It is preferred that the various structural and flexible members of the invention be fabricated of spring materials and that they have a coefficient of thermal expansion close to any surrounding components with which they are closely associated. Beryllium cooper has been found acceptable for these purposes.

While particular embodiments of the invention have been shown and described herein, it will be evident to those skilled in the art that the invention may be embodied otherwise without departing from its spirit and scope. Many varied embodiments incorporating the teachings of the present invention may easily be constructed by those skilled in the art.

What is claimed is:

1. A position control mechanism comprising:
   a mechanical structure having at least two members of different stiffnesses connected so that at least portions of said members can be moved in a first direction with respect to one another while other portions cannot;
   a structural framework, said other unmovable portions of said member being fixedly mounted to said structural framework such that said movable portions of said members can be positioned relative thereto; and
   means for adjusting the spacing between said movable portions of said members to provide for their controlled movement with respect to said structural framework, said movable portions of said members moving in said one direction at different rates with respect to said structural framework in accordance with their stiffnesses and the spacing imposed between them with the stiffer of said two members moving the least for a given spacing, said adjusting means including a coarse adjustment and a fine adjustment to provide for vernier positioning of said movable portions of said members with respect to said structural framework with the finest position control being of the movable portion of the stiffer of said members.

2. The position control mechanism of claim 1 wherein said means for adjusting the spacing between said movable portions of said members comprises a compound screw arrangement with a finely threaded screw mounted for movement in a coarsely threaded screw.

3. The position control mechanism of claim 1 wherein said two members of different stiffnesses are connected via a third member relatively stiffer than both, said two members each being cantilevered from said third member.

4. The position control mechanism of claim 1 further including means for mounting thereto at least one other similarly configured position control mechanism to control position in a second direction orthogonal to said first direction.

5. The position control mechanism of claim 1 wherein said mechanical structure and said structural framework are made of spring materials.

6. A position control mechanism comprising:
   a generally planar structural framework;
   a pair of independently adjustable mechanical structures spaced apart from one another on said structural framework, each of said pair of independently adjustable mechanical structures having portions movable relative to said structure framework so that, in combination, they may be used for controlling both the linear positions and angular relationship of one to the other in a first plane parallel to that of said structural framework, each of said independently adjustable mechanical structures comprising:
   (A) at least two members of different stiffness including said movable portions and connected to that said movable portions of said members can be moved in a first direction with respect to one another while other portions cannot, said other unmovable portions of said members being fixedly mounted to said structural framework such that said movable portions of said members can be independently positioned relative thereto; and
   (B) means for adjusting the spacing between said movable portions of said members to provide for their controlled movement with respect to said structural framework, said movable portions of said members moving in said one direction at different rates with respect to said structural framework in accordance with their stiffnesses and the spacing imposed between them with the stiffer of said two members moving the least for a given spacing, said adjusting means including a coarse adjustment and a fine adjustment to provide for vernier positioning of said movable portions of said members with respect to said structural framework with the finest position control being of the movable portion of the stiffer of said members.

7. The position control mechanism of claim 6 wherein said means for adjusting the spacing between said movable portions of said members of said independently adjustable mechanical structure comprises a compound screw arrangement with a finely threaded screw mounted for movement in a coarsely threaded screw.

8. The position control mechanism of claim 6 wherein said two members of different stiffness of said independently adjustable mechanical structure are connected via a third member relatively stiffer than both, said two members each being cantilevered from said third member.

9. The position control mechanism of claim 6 wherein each of said independently adjustable mechanical structures further include means for mounting thereto at least one other similarly configured independently adjustable mechanical structure to control position and angular orientation in a plane orthogonal to the planar orientation of said structural framework.

10. The position control mechanism of claim 6 wherein said independently adjustable mechanical structures and said structural framework are made of spring materials.

* * * * *